(12) United States Patent
Donald et al.

(10) Patent No.: US 6,320,994 B1
(45) Date of Patent: Nov. 20, 2001

(54) TOTAL INTERNAL REFLECTION OPTICAL SWITCH

(75) Inventors: David K. Donald, Mountain View; Julie E. Fouquet, Portola Valley; Mark A. Troll, Palo Alto, all of CA (US)

(73) Assignee: Agilent Technolgies, Inc., Palo Alto, CA (US)

( * ) Notice: Subject to any disclaimer, the term of this patent is extended or adjusted under 35 U.S.C. 154(b) by 0 days.

(21) Appl. No.: 09/470,878

(22) Filed: Dec. 22, 1999

(51) Int. Cl.$^7$ ................................. G02B 6/26; G02B 4/42
(52) U.S. Cl. ................................ 385/16; 385/17; 385/18; 385/19; 385/41
(58) Field of Search ..................... 385/16, 17, 18, 385/19, 25, 26, 41, 42

(56) References Cited

U.S. PATENT DOCUMENTS

| | | | |
|---|---|---|---|
| 4,988,157 | * | 1/1991 | Jackel ........................... 385/17 |
| 5,699,462 | * | 12/1997 | Fouquet ......................... 385/18 |
| 5,978,527 | | 11/1999 | Donald ........................... 385/17 |

FOREIGN PATENT DOCUMENTS

| | | | |
|---|---|---|---|
| 19527566 A1 | 1/1997 | (DE) | ............... G02B/6/35 |
| 1014140A2 | * 6/2000 | (EP) | . |
| 1014140 A2 | 6/2000 | (EP) | ............... G02B/26/01 |
| 0813088 A1 | 12/1997 | (EP) | ............... G02B/26/02 |
| 0938013 A2 | 8/1999 | (EP) | ............... G02B/26/02 |
| 2206977 A | 1/1989 | (GB) | ............... G02B/26/08 |
| 2204710 A | 11/1988 | (GB) | ............... G02F/1/315 |

* cited by examiner

Primary Examiner—Cassandra Spyrou
Assistant Examiner—Leo Boutsikaris

(57) ABSTRACT

An optical switch that is constructed on a substrate having first and second waveguides that intersect at a gap having a predetermined width. The first and second waveguides are positioned such that light traversing the first waveguide enters the second waveguide when the gap is filled with a liquid having a first index of refraction. The gap is part of a trench in the substrate having a first region that includes the gap and a second region adjacent to the first region. The second region has a width greater than the width of the first region. A liquid having the first index of refraction is disposed in the first region. The liquid generates a gas when heated to a predetermined temperature. A first heater is disposed in the first region for heating the liquid to the predetermined temperature thereby generating a gas bubble in the liquid at the gap. Light traversing the first waveguide is reflected by the gap when the gap is filled with a gas. To change the switch into the non-reflecting state, the bubble is displaced to the second region of the trench, in response to a control signal. The displacement mechanism can be constructed from a second heater having a portion thereof located in the first region between the first heater and the second region. The displacement mechanism can also be constructed from a mechanism that applies a pressure differential across the first region thereby causing the bubble to partially extend into the second region. A third waveguide having an end terminating on the trench can also be included in the optical switch. The third waveguide is positioned such that light traversing the first waveguide enters the third waveguide when the gap is not filled with liquid.

8 Claims, 3 Drawing Sheets

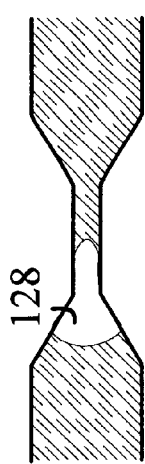
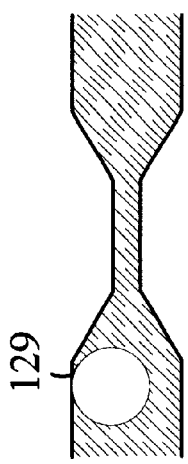
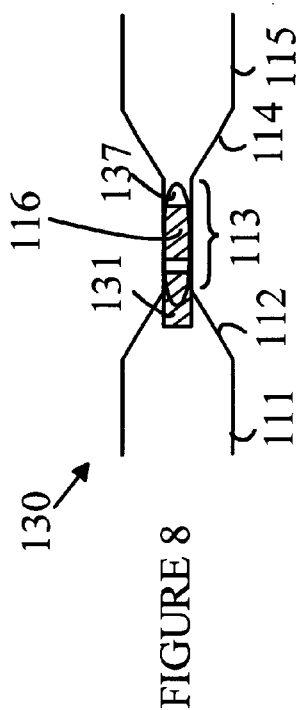
FIGURE 6
FIGURE 7
FIGURE 8
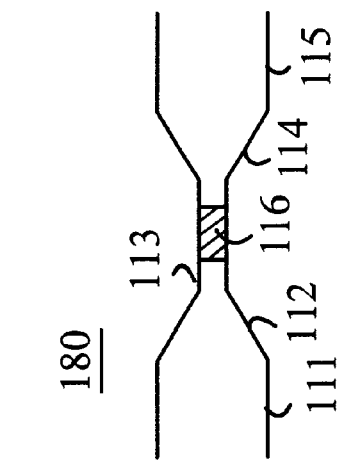
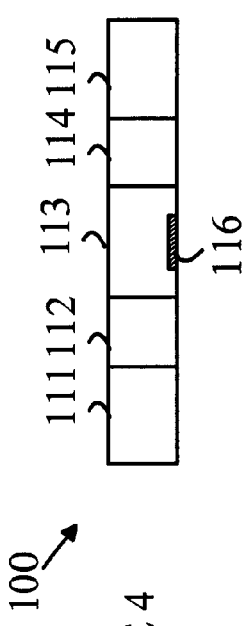
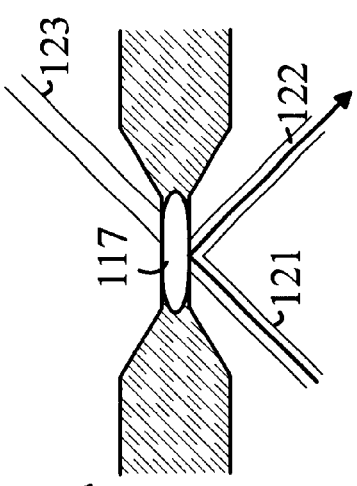
FIGURE 3
FIGURE 4
FIGURE 5

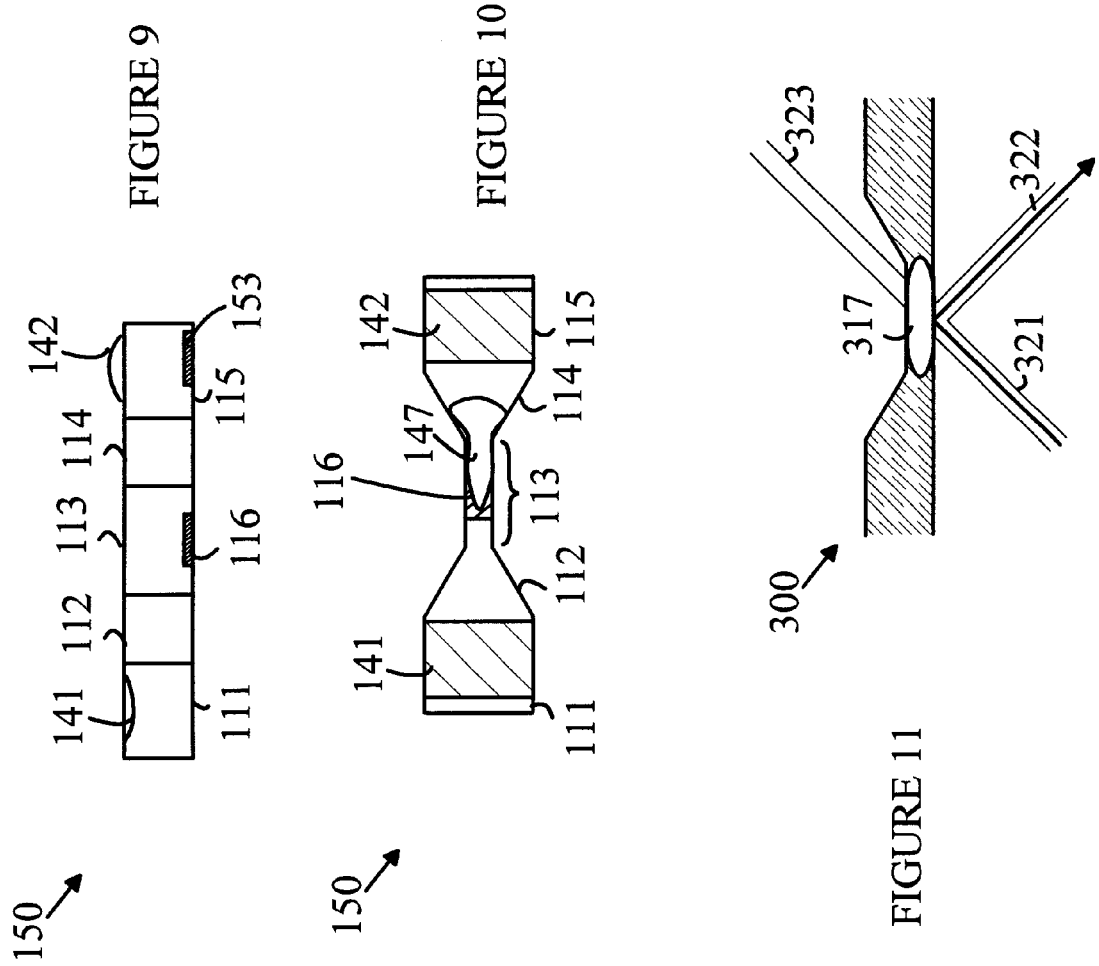

TOTAL INTERNAL REFLECTION OPTICAL SWITCH

FIELD OF THE INVENTION

The present invention relates to optical switches, and more particularly, to an improved cross-point switching element.

BACKGROUND OF THE INVENTION

Optical fibers provide significantly higher data rates than electronic paths. However, effective utilization of the greater bandwidth inherent in optical signal paths requires optical cross-connect switches. In a typical telecommunications environment, the switching of signals between optical fibers utilizes an electrical cross-connect switch. The optical signals are first converted to electrical signals. After the electrical signals have been switched, the signals are again converted back to optical signals that are transmitted via the optical fibers. To achieve high throughput, the electrical cross-connect switches utilize highly parallel, and highly costly, switching arrangements. However, even with such parallel architectures, the cross-connect switches remain a bottleneck.

A number of optical cross-connect switches have been proposed; however, none of these have successfully filled the need for an inexpensive, reliable, optical cross-connect switch. One class of optical cross-connects depends on wavelength division multiplexing (WDM) to affect the switching. However, this type of system requires the optical signals being switched to have different wavelengths. In systems where the light signals are all at the same wavelength, this type of system requires the signals to be converted to the desired wavelength, switched, and then be re-converted to the original wavelength. This conversion process complicates the system and increases the cost.

A second type of optical cross-connect utilizes total internal reflection (TIR) switching elements. A TIR element consists of a waveguide with a switchable boundary. Light strikes the boundary at an angle. In the first state, the boundary separates two regions having substantially different indices of refraction. In this state the light is reflected off of the boundary and thus changes direction. In the second state, the two regions separated by the boundary have the same index of refraction and the light continues in a straight line through the boundary. The magnitude of the change of direction depends on the difference in the index of refraction of the two regions. To obtain a large change in direction, the region behind the boundary must be switchable between an index of refraction equal to that of the waveguide and an index of refraction that differs markedly from that of the waveguide.

One class of prior art TIR elements that provide a large change in index of refraction operates by mechanically changing the material behind the boundary. For example, U.S. Pat. No. 5,204,921, Kanai, et al. describes an optical cross-connect based on an array of crosspoints in a waveguide. A groove at each crosspoint, may be switched "on" or "off," depending upon whether the groove is filled with an index-matching oil. The index-matching oil has a refractive index close to that of the waveguides. An optical signal transmitted through a waveguide is transmitted through the crosspoint when the groove is filled with the matching oil, but the signal changes its direction at the crosspoint through total internal reflection when the groove is empty. To change the cross-point switching arrangement, grooves must be filled or emptied. In the system taught in this patent, a "robot" fills and empties the grooves. This type of switch is too slow for many applications of interest.

A faster version of this type of TIR element is taught in U.S. Pat. No. 5,699,462 which is hereby incorporated by reference. The TIR taught in this patent utilizes thermal activation to displace liquid from a gap at the intersection of a first optical waveguide and a second optical waveguide. In this type of TIR, a trench is cut through a waveguide. The trench is filled with an index-matching liquid. A bubble is generated at the cross-point by heating the index matching liquid with a localized heater. The bubble must be removed from the crosspoint to switch the cross-point from the reflecting to the transmitting state and thus change the direction of the output optical signal.

If the bubble contains noncondensable gases (such as air), it takes too long (minutes) to collapse when the heater is turned off. This is not acceptable for most applications which require a faster cycle time. Such a gas bubble can be removed by applying a force to the bubble to move it out of the optical path, to one side.

The bubble can also be moved to another section of the trench by increasing the pressure on one side of the bubble. Such pressure increases can be accomplished by heating the fluid on one side of the cross-point or by physically displacing the fluid on one side of the cross-point so as to push or pull the bubble away from the cross-point. If the walls of the trench are parallel to one another, the displacement must be sufficient to move the entire bubble out of the cross-point area. Such large displacements require relatively long times or expensive hardware.

Broadly, it is the object of the present invention to provide an improved cross-point for use in cross-connect switches and the like.

It is a further object of the present invention to provide a cross-point in which the bubble clearing time is shorter than in prior art cross-point switches.

These and other objects of the present invention will become apparent to those skilled in the art from the following detailed description of the invention and the accompanying drawings.

SUMMARY OF THE INVENTION

The present invention is an optical switch that is constructed on a substrate having first and second waveguides that intersect at a gap having a predetermined width. The first and second waveguides are positioned such that light traversing the first waveguide enters the second waveguide when the gap is filled with a liquid having a first index of refraction. The gap is part of a trench in the substrate having a first region that includes the gap and a second region adjacent to the first region. The first region has parallel walls. The second region has a width greater than the width of the first region. Light traversing the first waveguide is reflected by the gap when the gap is filled with a gas. A liquid having the first index of refraction is disposed in the first region. The liquid generates a gas when heated to a predetermined temperature. A first heater is disposed in the first region for heating the liquid to the predetermined temperature thereby generating a gas bubble in the liquid at the gap. A displacement mechanism causes the gas bubble in the first region to extend partially into the second region in response to a control signal. The displacement mechanism can be constructed from a second heater having a portion thereof located in the first region between the first heater and the second region. The displacement mechanism can also be constructed from a mechanism that applies a pressure differential across the first region thereby causing the bubble to partially extend into the second region. A third waveguide having an end terminating on the trench can also be included in the optical switch. The third waveguide is positioned such that light traversing the first waveguide enters the third waveguide when the gap is not filled with liquid.

BRIEF DESCRIPTION OF THE DRAWINGS

FIG. 3 is a top view of a cross-point trench 100 according to the present invention.

FIG. 4 is a side view of trench 100.

FIG. 5 is a top view of a switching element 101 utilizing trench 100.

FIGS. 6 and 7 illustrate the manner in which a bubble in region 113 is displaced.

FIG. 8 is a top view of another embodiment of a cross-point trench according to the present invention.

FIG. 9 is a side view of another embodiment of a trench according to the present invention.

FIG. 10 is a top view of another embodiment of a trench according to the present invention.

FIG. 11 is a top view of another embodiment of a trench according to the present invention.

DETAILED DESCRIPTION OF THE INVENTION

Figure 2:
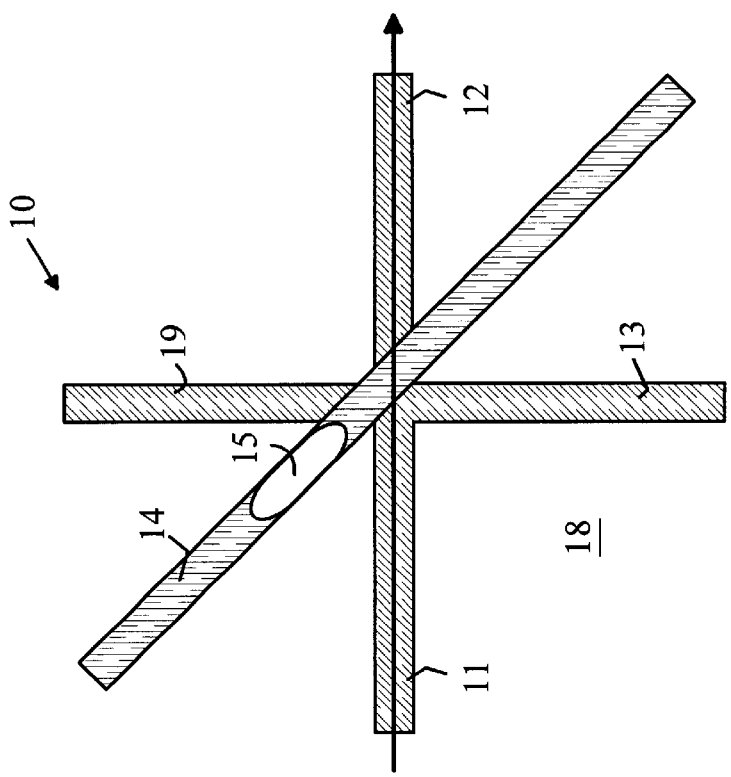
FIGS. 1 and 2 are top views of a prior art cross-point switching element 10 having two states.
Figure 1:
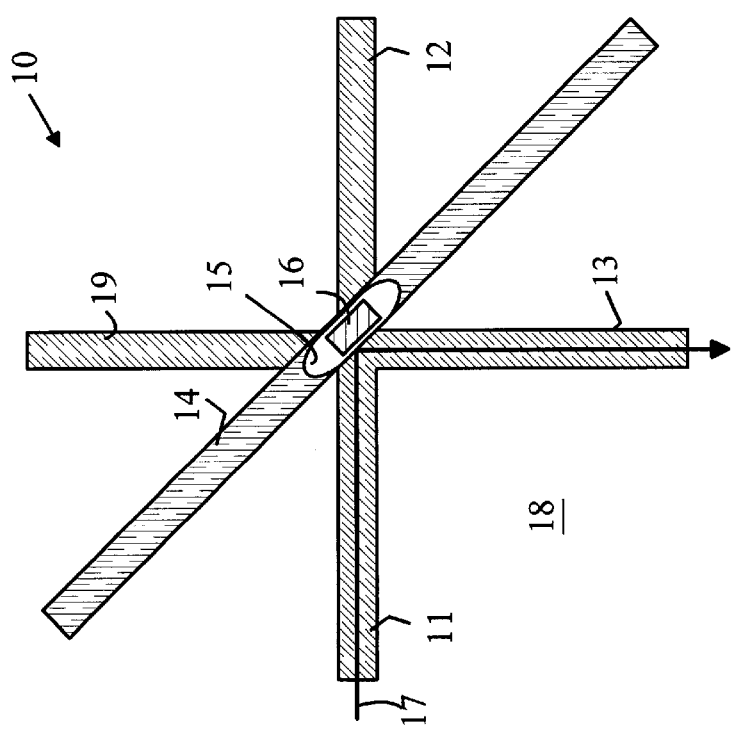

The present invention may be more easily understood with reference to FIGS. 1 and 2, which are top views of a prior art cross-point switching element 10 having two states. Switching element 10 is constructed from three waveguides 11–13 that are fabricated in a planar lightwave circuit on top of a substrate. The substrate is preferably a silica, but other materials, such as silicon, may be used. The waveguides are defined by two cladding layers and a core layer. To simplify the drawing, the individual layers have been omitted. The fabrication of such waveguides in silica is well known to the art, and hence will not be discussed in detail here. For example, Hitachi Cable and Photonic Integration Research, Inc. in Columbus, Ohio have demonstrated waveguides in $SiO_2$ on silica and silicon substrates. The core is primarily $SiO_2$ doped with another material, such as Ge or $TiO_2$. The cladding material is $SiO_2$, doped with another material such as $B_2O_3$ and/or $P_2O_5$. Because the core material has a refractive index that is different from the refractive index of the cladding layers, optical signals will be guided along waveguides 11–13.

A trench 14 is etched through the waveguide and preferably into the silicon substrate. Trench 14 is positioned such that a light signal travelling down waveguide 11 will be reflected into waveguide 13 if the index of refraction of the material filling trench 14 is substantially different from the index of refraction of the waveguides as shown in FIG. 1. This state of the switching element will be referred to as the "reflecting" state. If, however, the intersection of the trench and the waveguides is filled with a material having an index of refraction that matches that of the core of the waveguides, the light signal will pass through trench 14 and exit via waveguide 12 as shown in FIG. 2. This state of the switching element will be referred to as the "non-reflecting" state.

The angle at which waveguides 11 and 13 intersect trench 14 depends on the difference in the index of refraction between the waveguide material and the material used to create the reflecting state in the trench. The angles of incidence of the waveguides and the position of the trench are chosen such that light incident on the trench wall from waveguide 11 is totally reflected into waveguide 13. This angle is typically between 53 and 75 degrees with respect to the normal direction of the trench wall.

When the trench is filled with the index matching material, light traveling down a fourth waveguide 19 will pass into waveguide 13. Waveguide 19 is used to construct cross-connect switches utilizing a two-dimensional array of cross-point switching elements. An array of this type is typically constructed as a plurality of rows and columns of cross-point switching elements. The rows and columns are connected via row and column waveguides. The cross-connect switch connects signals input on the row waveguides to the column waveguides. The specific switching pattern depends on the states of the switching elements.

In these simple cross-connect switches, at any given time, there is at most one switching element in each column that switches light from a row waveguide into a column waveguide. The light switched into the column waveguide is transmitted to the end of the column through switching elements that are in the non-reflecting state. Waveguide 19 allows light switched by a switching element above element 10 in the array to be transmitted to the next switching element in the column below it so that the light can eventually exit from the last switching element in the column.

As noted above, the index matching material may be displaced from the intersection by forming a bubble 15 at the intersection with the aid of a heating element 16. Small heating elements suitable for this function are well known in the ink jet printing arts, and hence, will not be discussed in detail here. The heating element is preferably located below the waveguides to assure that light crossing the trench is not intercepted by the heating element. The bubble can be generated by vaporizing the index matching liquid or by releasing a gas dissolved in the liquid.

The bubble may be removed by allowing it to collapse or by moving it to one side as shown in FIG. 2. Moving the bubble to one side requires that the bubble be positively displaced by a distance of at least the length of the bubble. Such positive displacements pose technical problems.

The present invention reduces the amount of positive displacement needed to remove the bubble, and hence, avoids this problem. Refer now to FIGS. 3–5. FIG. 3 is a top view of a cross-point trench 100 according to the present invention. FIG. 4 is a side view of trench 100. Trench 100 replaces trench 14 shown in FIGS. 1 and 2. FIG. 5 is a top view of a switching element 101 utilizing trench 100. FIG. 5 illustrates the reflection of a light signal from the trench wall when a bubble 117 is present. To simplify the drawings, the waveguides shown at 121–123 in FIG. 5 have been omitted from FIGS. 3 and 4. Trench 100 is preferably etched in a substrate 180 and includes a gap section 113 having parallel walls that either reflect a light signal as shown in FIG. 5 or allow the light signal to pass through the trench when section 113 is filled with an index matching material. The portion of the trench on either side of section 113 is flared as shown at 112 and 114. A heating element 116 is located on the bottom of trench 100. In the preferred embodiment of the present invention, the walls 111 and 115 of the trench on either side of the flared region are parallel to one another; however, other geometries can be utilized without departing from the teachings of the present invention.

Refer now to FIGS. 6 and 7 which illustrate the manner in which a bubble in region 113 is displaced. The present invention is based on the observation that a bubble formed in region 113 that does not extend beyond 113 will remain within region 113 as shown in FIG. 5. However, if the bubble is displaced slightly to one side so that a portion of the bubble enters one of the flared regions as shown at 128 in FIG. 6, the bubble will be drawn into the flared region by the surface tension of the bubble until the bubble is entirely within the flared region or region beyond the flared region as shown in FIG. 7 at 129. Once the bubble is displaced into the flared region, the trench will be transparent to the light and the cross-point will have been switched. The bubble will then collapse without further aid. If the cross-point must be switched back to the reflective state, a new bubble can be introduced in region 113 by re-activating heating element 116.

Refer now to FIG. 8, which is a top view of another embodiment of a cross-point trench 130 according to the present invention. To simplify the following discussion, those features of trench 130 that serve the same functions as features of trench 100 shown in FIGS. 3 and 4 have been given the same numeric designations. Trench 130 differs from trench 100 in that a second heating element shown at 131 has been introduced on the bottom of the trench at a location that is partially in flared region 112. Heating element 131 is used to destabilize a bubble generated by heating element 116 in region 113 such as the bubble shown at 137. When heating element 131 is activated, bubble 137 is enlarged in the area over heating element 131. The new bubble now extends into the flared region of the trench. As noted above, such a bubble is automatically drawn into the flared region and out of region 113 by the mechanism described above with reference to FIGS. 6 and 7. It should be noted that the heater shown in FIG. 8 can also be placed on the other end of region 113.

A bubble in region 113 can also be displaced sufficiently to cause it to leave region 113 by generating a pressure differential across region 113. Refer now to FIGS. 9 and 10 which are side and top views, respectively, of another embodiment of a trench according to the present invention. To simplify the following discussion, those features of trench 130 that serve the same functions as features of trench 100 shown in FIGS. 3 and 4 have been given the same numeric designations. Trench 150 includes two diaphragms, shown at 141 and 142 that can be deformed to alter the pressure in trench 150. In the embodiment shown in FIGS. 9 and 10, the diaphragms are operated in a "push-pull" manner such that the pressure on one side of region 113 is increased while the region on the other side is decreased. This pressure differential is sufficient to shift the location of bubble 147 sufficiently into region 114 to cause the bubble to leave region 113.

The required displacement is much smaller than in systems requiring displacement to completely move the bubble out of region 113. Diaphragm designs of the type utilized in ink jet printers may be utilized for this purpose. While the embodiment shown in FIGS. 9 and 10 utilizes diaphragms that are placed over the top of the trench, it will be obvious to those skilled in the art from the preceding discussion that any device that alters the pressure or volume on at least one side of region 113 may be utilized, for example piezoelectric transducers or micromechanical devices. For example, a heating element 153 may be placed in region 115 with sufficient power to generate a bubble that alters the pressure on the side of region 113 having the heater. After the bubble in region 113 has been dislodged, the pressure inducing bubble is allowed to collapse.

The length of region 113 is preferably chosen to be sufficiently large to accommodate the entire light signal passing through region 113 when the switching element is transparent. Due to the nature of optical propagation in planar lightwave circuits, this region must be slightly larger than the waveguide cores that terminate on each side of region 113.

In the preferred embodiment of the present invention, the trench walls on each side of region 113 are parallel to one another, that is, the waveguide segments 11 and 12 are collinear and segments 19 and 13 are collinear". In principle, only the wall that reflects the light signal when the switch is in the reflective state needs to be planar. However, if a liquid must be used whose refractive index does not exactly match that of the waveguide, the optical signal refracts as it enters the liquid when the trench is in the transparent state and again as it exits. This refraction leads to a net lateral translation. The exit waveguide of the switching element can be moved to accommodate this translation. If the trench walls are parallel at the entry and exit points, the original waveguide pitch and angle can be maintained despite these translations. However, it the entry and exit walls are not parallel, the exit waveguide angle differs from the entrance waveguide angle and the pitch is distorted. These changes complicate the optical interconnections required when constructing a cross-point switch having many switching elements, leading to increased cost.

The above-described embodiments of the present invention have three waveguides; however, embodiments having only two waveguides can also be constructed. Referring to FIG. 1, either waveguide 12 or waveguide 13 can be replaced by a light absorbing medium. In such an embodiment, the optical switch has a first state that transmits the light signal from the input waveguide to the remaining output waveguide, and a second state in which the light signal is absorbed. The embodiment in which output waveguide 13 is eliminated is particularly useful in constructing N:1 optical multiplexers.

The above-described embodiments of the present invention have utilized a flared region to each side of the gap in the trench. However, the flared region can be eliminated provided the region on the side of the gap to which the bubble is to be displaced is larger than the gap. Refer now to FIG. 11, which is a top view of a trench 300 that utilizes such an alternative configuration. Trench 300 connects waveguides 321 to 322 when bubble 317 is present in the trench and connects waveguides 321 and 323 when the trench is filled with an index matching liquid.

Various modifications to the present invention will become apparent to those skilled in the art from the foregoing description and accompanying drawings. Accordingly, the present invention is to be limited solely by the scope of the following claims.

What is claimed is:

1. An optical switch comprising:
   a substrate including first and second waveguides, said first and second waveguides intersecting at a gap having a predetermined width, said first and second waveguides being positioned such that light traversing said first waveguide enters said second waveguide when said gap, said first region having parallel walls, is filled with a liquid having a first index of refraction while light traversing said first waveguide is reflected by said gap when said gap is filled with a gas, wherein said gap is part of a trench in said substrate, said trench having a first region containing said gap and a second region adjacent to said gap, said second region having a width greater than said width of said first region;

a liquid having said first index of refraction disposed in said first region, said liquid generating a gas when heated to a predetermined temperature;

a first heater disposed in said first region for heating said liquid to said predetermined temperature thereby generating a gas bubble in said liquid at said first region; and a displacement mechanism for causing said gas bubble in said first region to extend partially into said second region in response to a control signal.

2. The optical switch of claim 1 wherein said displacement mechanism comprises a second heater having a portion thereof located in said first region between said first heater and said second region of said gap.

3. The optical switch of claim 2 wherein said second heater extends into said second region.

4. The optical switch of claim 1 wherein said trench comprises a third region having a width greater than said width of said first region, said first region being located between said second and said third regions, and wherein said displacement mechanism comprises a mechanism for inducing a pressure differential across said first region.

5. The optical switch of claim 4 wherein said displacement mechanism comprises a third heater located in said second region or said third region of said trench.

6. The optical switch of claim 4 wherein said displacement mechanism comprises a mechanical device for displacing said liquid in said second or said third region of said trench.

7. The optical switch of claim 1 further comprising a third waveguide having an end terminating on said trench, said third waveguide being positioned such that light traversing said first waveguide enters said third waveguide when said gap is not filled with liquid.

8. The optical switch of claim 1 wherein said first and second waveguides are aligned such that light from said first waveguide enters said second waveguide when said first index of refraction differs from the index of refraction of said first and second waveguides.

* * * * *